T. W. Buck,

Churn.

No. 69,538.   Patented Oct. 8. 1867.

Witnesses
Isaac D. Toll
T. C. Gillett

Inventor
Thomas W. Buck

The above signature by Examiner in charge

United States Patent Office

THOMAS W. BUCK, OF FAWN RIVER, MICHIGAN.

Letters Patent No. 69,538, dated October 8, 1867.

---

IMPROVEMENT IN CHURNS.

---

The Schedule referred to in these Letters Patent and making part of the same.

---

TO ALL WHOM IT MAY CONCERN:

Be it known that I, THOMAS W. BUCK, of Fawn River, in the county of St. Joseph, and State of Michigan, have invented a new and useful Improvement in Churns; and I do hereby declare that the following is a full and exact description thereof, reference being had to the accompanying drawings and to the letters of reference marked thereon.

The nature of my invention consists in constructing a double-winged valve, or a pair of double-winged valves, in a churn-dasher with one wing solid and the other provided with a detachable wire gauze or screen-like slide, which may be removed for the more commodious gathering of the butter, the solid valve or wing being by the downward motion of the dasher placed at an oblique angle with regard to the other (the sieve-like detachable wing) so as to secure a longer and more circuitous passage for the cream in its escape upward, which, after passing through the wire gauze wing or valve, meets that portion of it (the cream) which is forced up through or at the sides of the churn, between the walls of the churn and the dasher, thus producing increased agitation. These valves or wings are pivoted so as to present less resistance in the upward motion of the dasher, the cream passing through their tops and sides. The inner valve may be made of solid perforated material, but I prefer the plan stated.

To enable others to use my invention, I will proceed to describe its construction.

Figure 1:
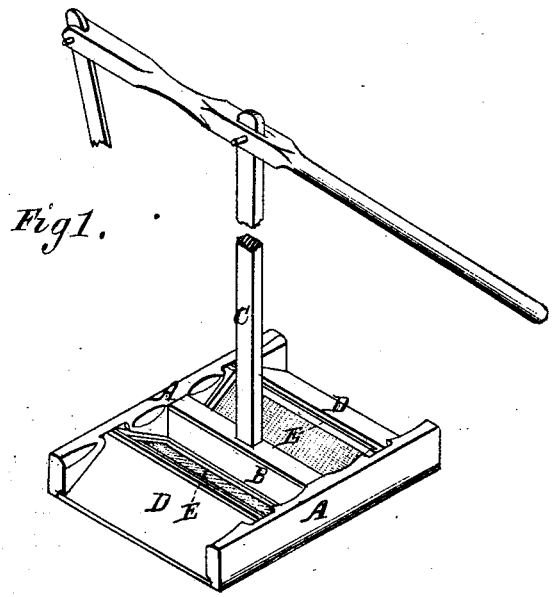

Figure 1 is a perspective view of the dasher complete; A representing the side pieces, to which the valves or wings are attached; B the cross-piece, secured to the sides, to which the handle C is fastened; D the solid, and E the removable wing, made of wire gauze. It may be made of fibrous material.

Figure 2:
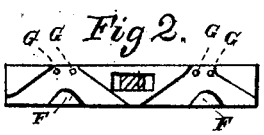

Figure 2 shows the interior of one of the side pieces, with a projection, F, upon which the wings rest in the upward motion of the dasher. For the easier gathering of the butter I prefer to have the detachable wings, or wire gauze slides, placed inwardly, or opposite each other. I may add that their rough surfaces and perforations aid in breaking up the cream. In fig. 2, G represents apertures in the side piece, in which the pivoted valves play.

Figure 3:
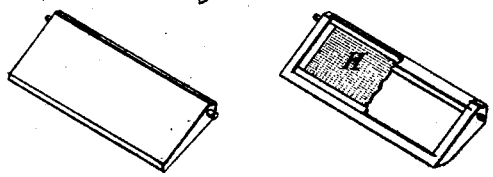

Figure 3 shows the valves or wings separately, H representing the slide partly removed.

What I claim, and desire to secure by Letters Patent, is—

The valve E, with its removable sieve-like slide, when employed for the uses and purposes expressed.

I further claim the arrangement of the valves D and E, constructed and operating substantially as shown for the purposes set forth.

THOMAS W. BUCK.

Witnesses:
  ISAAC D. TOLL,
  T. C. GILLETT.